United States Patent [19]
Toyama et al.

[11] Patent Number: 5,930,223
[45] Date of Patent: Jul. 27, 1999

[54] DISC CHANGER

[75] Inventors: Yasunari Toyama, Osaka; Shingo Kage, Kobe; Makoto Kambayashi, Neyagawa, all of Japan

[73] Assignee: Matsushita Electric Industrial Co., Ltd., Osaka, Japan

[21] Appl. No.: 08/917,825

[22] Filed: Aug. 27, 1997

[30] Foreign Application Priority Data

Aug. 28, 1996 [JP] Japan .................................. 8-226537

[51] Int. Cl.⁶ .................................................. G11B 17/04
[52] U.S. Cl. ............................................................ 369/178
[58] Field of Search ........................... 369/178, 191–192, 369/34, 36; 360/98.01, 98.04, 99.02, 92

[56] References Cited

U.S. PATENT DOCUMENTS 5,493,556  2/1996  Aoki et al. .............................. 369/191
5,587,989  12/1996  Fujiwara et al. ....................... 369/191

*Primary Examiner*—Allen T. Cao
*Attorney, Agent, or Firm*—Wenderoth, Lind & Ponack, L.L.P.

[57] ABSTRACT

A disc or tray is prevented from inadvertently springing out of a magazine when the magazine is mounted or an external force is exerted. Provided is a disc changer having a magazine mounting section, a recording and reproducing unit, a slider which selects a desired disc from a plurality of discs lodged in a magazine and a transfer arm which draws the selected disc out of the magazine and loads the disc on the recording and reproducing unit 10. The disc changer is provided with a lock member which prevents each disc from springing out of the magazine at least in a disc non-selective state in which the slider does not execute disc selection, and the mounting of the magazine in the magazine mounting section is executed when the slider 21 is in the disc non-selective state.

3 Claims, 17 Drawing Sheets

DISC CHANGER

BACKGROUND OF THE INVENTION

The present invention relates to a disc changer to be used for a disc which serves as a data recording medium such as CD (Compact Disc).

Conventionally, as a disc changer to be used for a disc which serves as a data recording medium such as CD, there has been a known disc changer which has a magazine mounting section in which a magazine capable of lodging therein a plurality of discs is mounted. The changer is also provided with a recording and reproducing unit for recording information on a disc and reproducing the information recorded on the disc, a disc selecting mechanism for selecting the desired disc from the plurality of discs lodged in the magazine and a disc loading mechanism for drawing the selected disc out of the magazine and loading it on the recording and reproducing unit as fundamental constituent elements.

In such a disc changer, each disc is lodged in the magazine as normally retained on a tray.

FIGS. 19 and 20 illustrate an explanatory plan view and an explanatory side view showing an example of a magazine 90 to be mounted in a prior art disc changer, where no disc is shown.

As shown in these figures, trays 96 (i.e., discs) are lodged as stacked at specified intervals inside the magazine 90, and the selected disc is drawn in a direction in which the disc surfaces extend together with the tray 96 that is retaining the disc and then loaded on a recording and reproducing unit (not shown) located in a position on the right-hand side of the figures. In this case, each tray 96 is drawn rightward in FIGS. 19 and 20 against a spring force of a tray retaining spring 92 which retains the tray 96 inside the magazine 90.

In the prior art construction, each tray 96 is retained inside the magazine 90 only by the spring force of the above-mentioned tray retaining spring 92, and there is a concern that the disc and/or the tray 96 springs out of the magazine 90 when a great vibration is externally applied. Particularly, in the case of a disc changer for onboard use in a vehicle, it has abundant opportunity to receive an external vibration input, and this increases the possibility of the occurrence of the above-mentioned trouble. Furthermore, when at least the direction in which the magazine 90 is mounted substantially coincides with the direction in which each tray 96 (i.e., disc) is drawn to the recording and reproducing unit side, there is a concern that the disc and/or the tray 96 springs out of the magazine 90 in the case where the magazine 90 is forcibly inserted into the disc changer with a force greater than a certain degree or in a similar case even when there is no concern about the external vibration input.

When such a situation arises, the disc and/or the tray 96 which springs out of the magazine 90 interferes with the recording and reproducing unit, and this may cause a faulty operation, a trouble in taking out the magazine itself or another trouble.

SUMMARY OF THE INVENTION

The present invention has been developed in view of the aforementioned technical problems and has an object to provide a disc changer capable of preventing discs or trays from inadvertently springing out of the magazine when the magazine is mounted or when an external force is exerted.

Therefore, according to the first aspect of the present invention, there is provided a disc changer having a magazine mounting section to be mounted with a magazine capable of lodging therein a plurality of discs, a recording and reproducing unit for recording information on a disc or reproducing the information recorded on the disc, a disc selecting mechanism for selecting a desired disc from the plurality of discs lodged in the magazine and a disc loading mechanism for drawing the selected disc out of the magazine and loading the disc on the recording and reproducing unit. The disc changer includes a lock for preventing each disc from springing out of the magazine at least in a disc non-selective state in which the disc selecting mechanism does not execute disc selection, whereby mounting of the magazine in the magazine mounting section is executed when the disc selecting mechanism is in the disc non-selective state.

According to the second aspect of the present invention, based on the disc changer of the first aspect of the present invention, the discs are lodged in a stacked manner at specified intervals inside the magazine as retained on respective trays, and the disc selected by the disc selecting mechanism is drawn out in a direction in which disc surfaces extend together with the tray that is retaining the disc and loaded on the recording and reproducing unit by the disc loading mechanism. On the other hand, the lock is provided with a lock member arranged movably in the direction in which the discs are stacked between the magazine and the recording and reproducing unit, and the lock member is provided with projecting sections which are formed at the specified intervals in the direction in which the discs are stacked and extend in a direction perpendicular to a direction in which the discs and/or trays spring out and groove sections which are formed between the projecting sections and allow the discs and trays to pass therethrough.

Furthermore, according to the third aspect of the present invention, there is provided a disc changer having a magazine mounting section to be mounted with a magazine capable of lodging therein a plurality of discs retained on respective trays, a recording and reproducing unit for recording information on a disc or reproducing the information recorded on the disc, a disc selecting mechanism for selecting a desired disc from the plurality of discs lodged in the magazine and a disc loading mechanism for drawing the selected disc out of the magazine together with the tray that is retaining the disc and loading the disc on the recording and reproducing unit. The disc changer includes a lock capable of preventing each disc and/or tray from springing out of the magazine, and each tray includes a locking operation section which operates to put the lock into a locked state in which it prevents the disc and/or tray from springing out by being drawn out to the recording and reproducing unit side.

Furthermore, according to the fourth aspect of the present invention, based on the disc changer of the third aspect of the present invention, the discs are lodged in a stacked manner at specified intervals inside the magazine as retained on respective trays, and the disc selected by the disc selecting mechanism is drawn out in a direction in which disc surfaces extend together with the tray that is retaining the disc and loaded on the recording and reproducing unit by the disc loading mechanism. On the other hand, the lock is provided with a lock member arranged movably in the direction in which the discs are stacked between the magazine and the recording and reproducing unit, and the lock member is provided with projecting sections which are formed at the specified intervals in the direction in which the discs are stacked and extend in a direction perpendicular to a direction in which the discs and/or trays spring out and groove sections which are formed between the projecting sections and allow the discs and trays to pass therethrough. Then, the locking operation section of each tray operates the lock member in the direction in which the discs are stacked by being engaged with the projecting section adjacent to the groove section in a state in which the tray is drawn out to the recording and reproducing unit side through the groove section corresponding to the selected disc and/or tray.

DETAILED DESCRIPTION OF THE PREFERRED EMBODIMENTS

Preferred embodiments of the present invention will be described in detail below with reference to the accompanying drawings.

Figure 1:
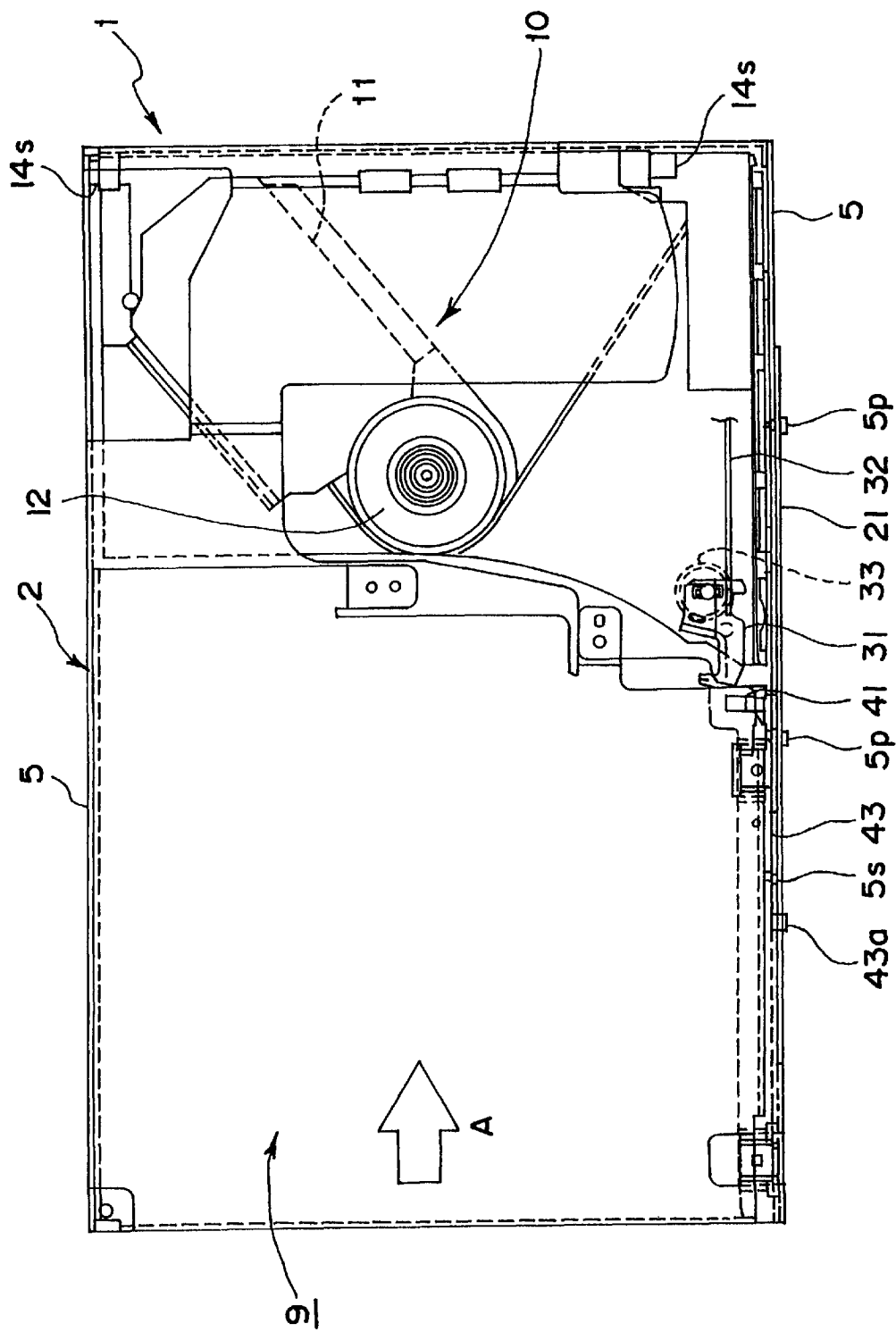
FIG. 1 is an explanatory plan view showing the schematic construction of a disc changer according to a first embodiment of the present invention.
Figure 2:
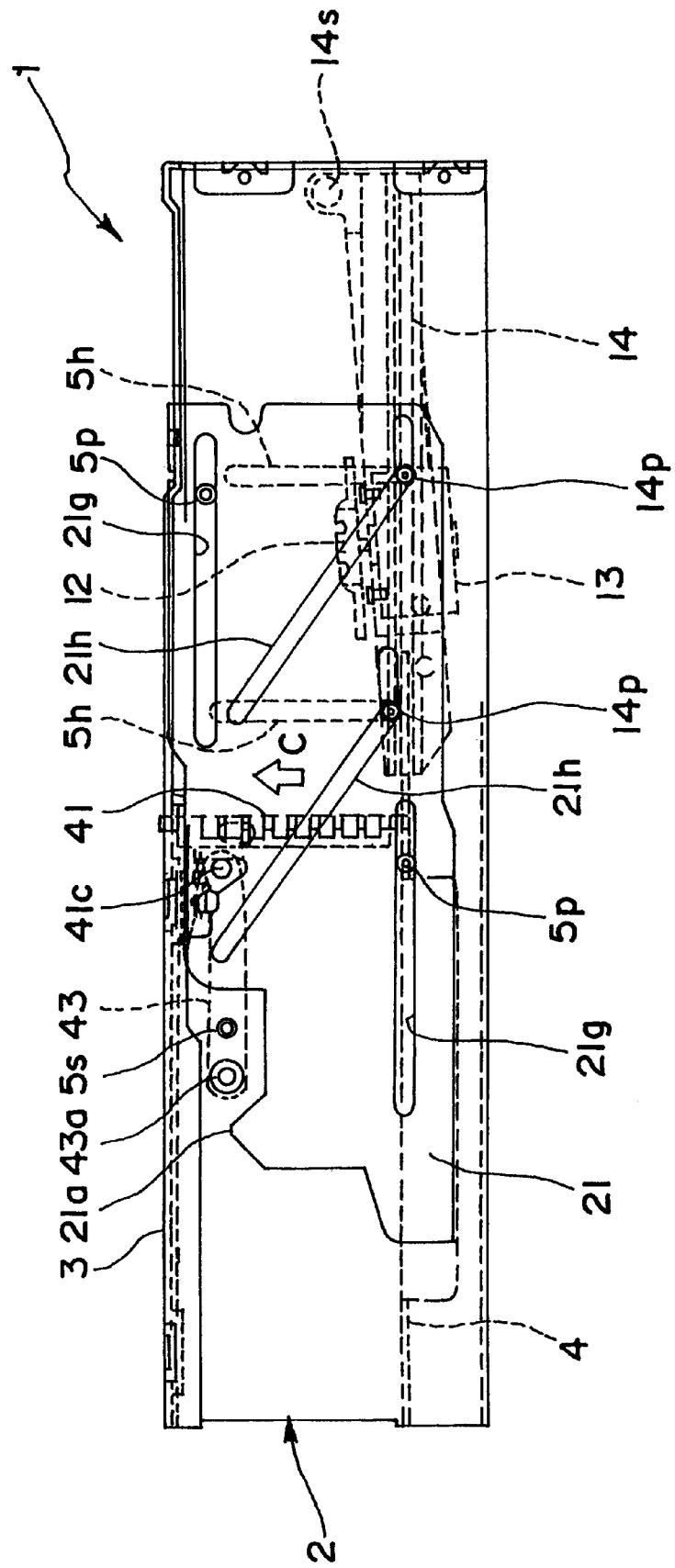
FIG. 2 is an explanatory side view of the above disc changer.
Figure 3:
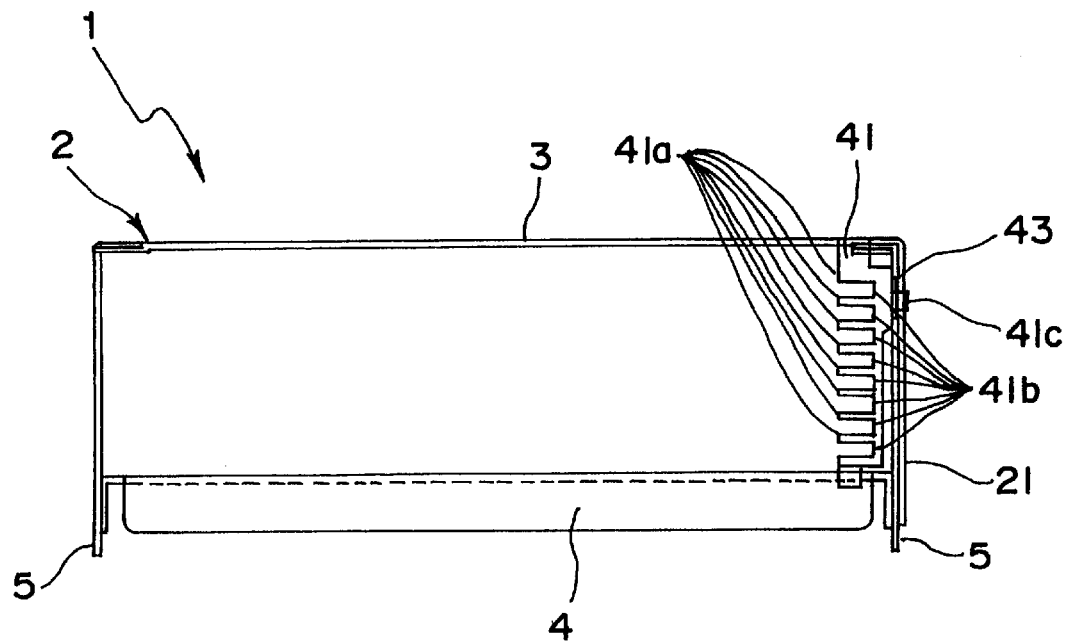
FIG. 3 is an explanatory front view of the above disc changer.

FIGS. 1, 2 and 3 illustrate an explanatory plan view, an explanatory side view and an explanatory front view, respectively, schematically showing the construction of a disc changer 1 according to the present embodiment.

As shown in these figures, the disc changer 1 is provided with a recording and reproducing unit 10 which serves as a means for recording information on a disc and reproducing the information recorded on the disc (not shown) which serves as a data recording medium such as CD (Compact Disc) located in one side region inside a main body 2 constituting an approximately rectangular parallelepiped casing. The other side region inside the main body 2 forms a space located adjacent in the lengthwise direction to the main body 2 of the recording and reproducing unit 10, and this space constitutes a magazine mounting section 9 for mounting a magazine capable of lodging therein a plurality of discs.

As clearly shown in FIG. 2, the recording and reproducing unit 10 has a turntable 12 for rotating the disc placed on it, a drive motor 13 for rotatively driving the turntable 12, and a pickup section 11 (see FIG. 1) which has a base block 14 for supporting the drive motor 13 and the turntable 12 and operates to write information on the disc or read the information recorded on the disc that is rotated on the turntable 12.

Figure 4:
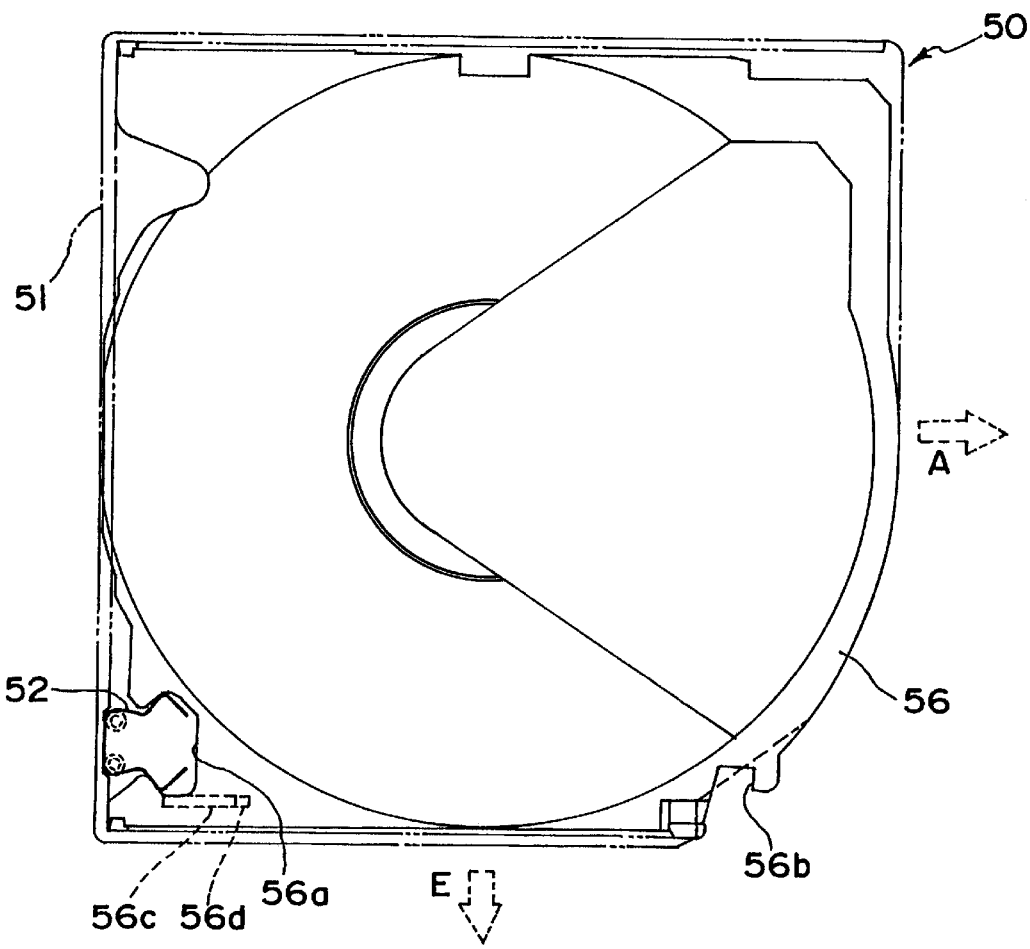
FIG. 4 is an explanatory plan view showing the schematic construction of a magazine to be mounted in the above disc changer.
Figure 5:
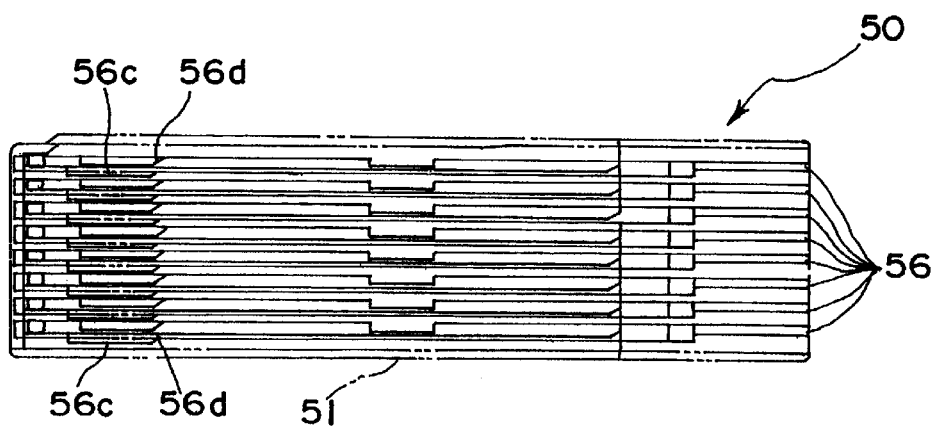
FIG. 5 is an explanatory side view of the above magazine.

A magazine 50 to be mounted in the magazine mounting section 9, the construction of which is schematically shown in FIGS. 4 and 5, has a magazine body 51 whose outer configuration is formed totally into an approximately rectangular parallelepiped shape. The magazine 50 can lodge therein a plurality of discs (eight discs in the present embodiment) (not shown) which are stacked at specified intervals while being preferably placed on the respective disc retaining trays 56 inside this magazine body 51 by, for example, a plurality of parallel frame sections (not shown) provided inside the main body 51.

Then, this magazine 50 is mounted in the magazine mounting section 9 inside the disc changer 1 as inserted in a direction indicated by arrow A in FIGS. 1 and 4.

That is, according to the present embodiment, the direction in which the magazine 50 is mounted in the magazine mounting section 9 coincides with the direction in which the discs are drawn out of the magazine 50 to the recording and reproducing unit 10 side.

The magazine body 51 is provided with a tray retaining spring 52 for retaining each tray 56 inside the magazine body 51, while an engagement portion 56a to be engaged with the tray retaining spring 52 is formed at one end side of each tray 56. Each tray 56 is normally retained inside the magazine body 51 by the spring force of this tray retaining spring 52. That is, each tray 56 is restricted in movement in the direction of arrow A within a range of the retaining force attributed to this spring force.

On the other hand, a flat-plate-shaped slider 21 is fitted to the outside of a side plate 5 on one side (rightward in FIG. 3) of the disc changer body 2, and the slider 21 is provided with, for example, two elongated-hole-shaped horizontal guide grooves 21g extending in its lengthwise direction (i.e., in the horizontal direction in FIG. 2). These horizontal guide grooves 21g are slidably engaged with pin members 5p provided as fixed on the side plate 5. When the slider 21 is moved in the lengthwise direction of the side plate 5 (i.e., in the horizontal direction in FIG. 2), the horizontal guide grooves 21g are guided by the pin members 5p so as to move smoothly relative to each other.

Furthermore, the slider 21 is provided with a pair of inclined guide grooves 21h which extend totally in an inclined direction. It is to be noted that a horizontal portion having a specified length is formed at the lower end of each of the inclined guide grooves 21h. Further, the side plate 5 is provided with vertical guide grooves 5h which extend in a direction perpendicular to the lengthwise direction (i.e., in the vertical direction in FIG. 2).

On the other hand, the base block 14 of the recording and reproducing unit 10 is provided with guide pins 14p which extend through both the vertical guide grooves 5h and the inclined guide grooves 21h as fixed to the base block. With the movement of the slider 21 in the lengthwise direction of the side plate 5 (i.e., in the horizontal direction in FIG. 2), the guide pins 14p move along the inclined guide grooves 21h relatively to each other, and in accordance with this the guide pins 14p move vertically along the vertical guide grooves 5h.

An end portion opposite to the magazine mounting section side of the base block 14 is swingably supported to an upper plate (not shown) of the recording and reproducing unit 10 via a pair of pivot axes 14s. With the vertical movements of the guide pins 14p, the tilt angle of the base block 14 is varied.

Thus, by the horizontal movement of the slider 21, the relative position of the disc lodged in the magazine 50 with respect to the recording and reproducing unit 10 is varied, so that the disc to be transferred to the recording and reproducing unit 10 out of the plurality of discs inside the magazine 50 is selected. That is, the slider 21 constitutes a disc selecting means for selecting the desired disc out of the plurality of discs lodged in the magazine 50, while the slider 21, the inclined guide grooves 21h, the vertical guide grooves 5h of the side plate 5 and the guide pins 14p and the pivot axes 14s of the base block 14 are combined with one another, constituting a mechanism for disc selection.

It is to be noted that the slider 21 can be operated by, for example, electricity according to the contents of designation made by the user who designates the desired disc or the sequence of the discs to be used by means of, for example, an operating button provided on an operating panel (not shown) of an audio apparatus in which the disc changer 1 is incorporated.

Further, the disc changer 1 is provided with a disc loading mechanism for drawing the disc selected by the disc selecting mechanism (slider 21) out of the magazine 50 and loading the disc on the recording and reproducing unit 10.

That is, between the magazine mounting section 9 and the recording and reproducing unit 10 is arranged a transfer arm 31 (see FIG. 1) capable of being engaged with an engagement tab 56b (see FIG. 4) provided at an end portion of the tray 56. The transfer arm 31 has a rack portion to be meshed with, for example, a drive gear 33 and is fixed to a rack member 32 provided movably in the lengthwise direction of the disc changer body 2. The rack member 32 is moved by rotating the drive gear 33 by an electric motor (not shown) or the like via a gear train, thereby allowing the transfer arm 31 to be moved by a specified quantity in a specified direction between the magazine mounting section 9 and the recording and reproducing unit 10.

The disc thus selected by the movement of the slider 21 is drawn in a direction in which the disc surface extends together with the tray 56 by the movement of the transfer arm 31 engaged with the engagement tab 56b of the tray 56 that is retaining the disc and then loaded on the turntable 12 of the recording and reproducing unit 10.

That is, the transfer arm 31 constitutes a disc loading device for drawing the selected disc together with the tray 56 in the direction in which the disc surface extends and loading them on the recording and reproducing unit 10, while the transfer arm 31, the rack member 32, the drive gear 33 and so forth are combined with one another to constitute a mechanism for disc loading.

Furthermore, the present embodiment is provided with a lock for preventing each disc and tray from inadvertently springing out of the magazine 50 when the magazine is mounted or an external force is exerted.

That is, as clearly shown in FIGS. 2 and 3, between the magazine mounting section 9 and the recording and reproducing unit 10 is provided a lock member 41 that is movable in the vertical direction (i.e., in the direction in which the discs are stacked inside the magazine 50) as arranged between an upper plate 3 and a lower plate 4 of the disc changer body 2.

Figure 6:
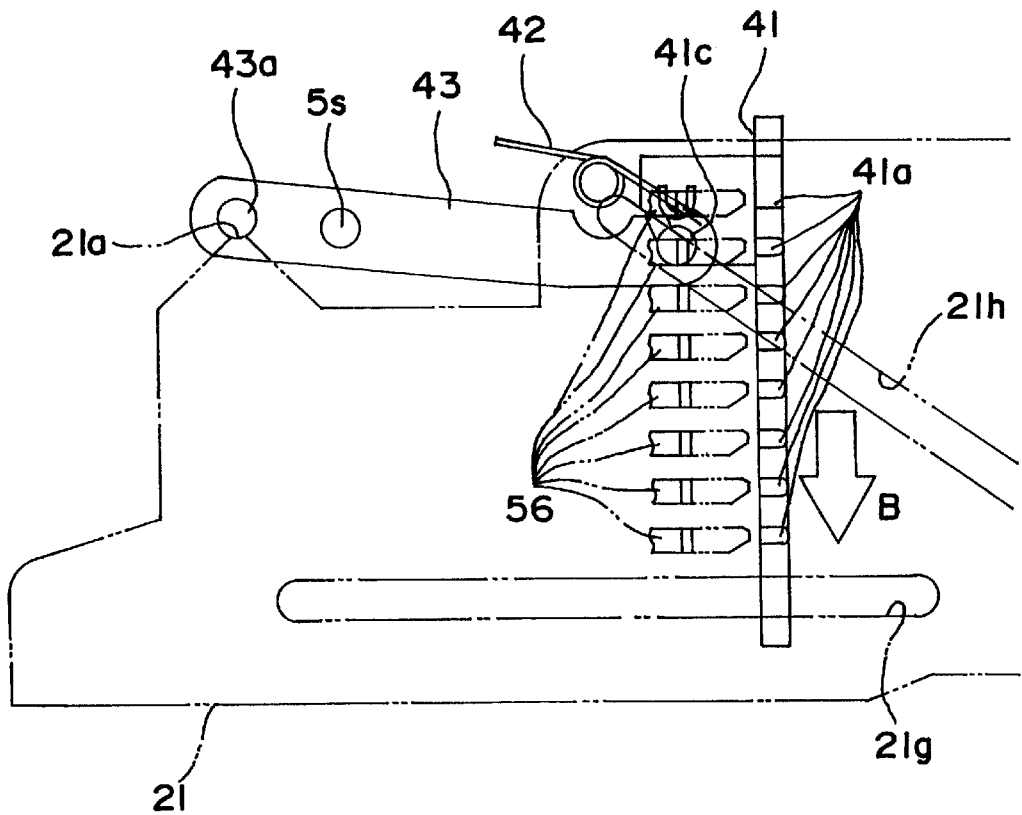
FIG. 6 is an explanatory enlarged side view of a lock member and a tray in a magazine insertion standby state.
Figure 7:
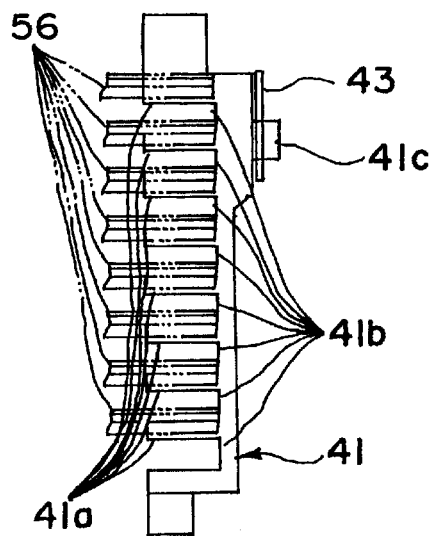
FIG. 7 is an explanatory enlarged front view of the lock member and the tray in the magazine insertion standby state.

As shown in detail in FIGS. 6 and 7, the lock member 41 is arranged with its length directed in the direction in which the discs are stacked (in the vertical direction in FIGS. 6 and 7), and it has a plurality of (eight in the present embodiment) projecting portions 41a provided at intervals approximately equal to the disc stacking intervals.

These projecting portions 41a extend in a direction perpendicular to the direction in which the disc and/or tray 56 springs out (i.e., in the direction in which these are transferred to the recording and reproducing unit 10 side), and groove portions 41b formed between the projecting portions 41a having a width set so that the disc and the tray 56 can pass therethrough.

The lock member 41 is engaged with a spring 42 mounted to the side plate 5 of the disc changer body 2, and it is always urged in an upward direction (in the direction of arrow C in FIG. 2) by the urging force of the spring 42. Then, in the state in which it is lifted upward as urged in the direction of arrow C, the groove portions 41b of the lock member 41 are set so as to face the discs and/or the trays 56 lodged in the magazine 50.

Furthermore, on the outer surface of the lock member 41 is arranged a swing arm 43 which is engaged with an engagement projection 41c provided as fixed to the lock member 41 and is swingably supported to a pivot axis 5s fixed to the side plate 5 of the disc changer body 2.

The operation of the disc changer 1 constructed as above will be described below.

First, when inserting the magazine 50 into the magazine mounting section 9 for the mounting of the magazine, the slider 21 which serves as an operating member of the disc selecting means is moved to a specified position other than a disc selecting position prior to the insertion of the magazine. In this specified position, an engagement projection 21a provided in an upper portion of the slider 21 is set so that it is engaged with a fixed pin 43a of the swing arm 43 as shown in FIG. 6. By the engagement between both the members 21a and 43a, the swing arm 43 pivots clockwise in FIG. 6 around the pivot axis 5s. By this operation, the lock member 41 is depressed by a specified quantity in the direction of arrow B (downward) in FIG. 6 against the urging force of the spring 42.

Then, the projecting portions 41a of the lock member 41 are set so that they face the discs and/or trays 56 lodged in the magazine 50 in the state in which the lock member 41 is depressed.

In the present embodiment, a monitor signal of a motor (not shown) for driving the slider 21 is inputted to a control section (not shown) of the disc changer 1, and the position of the slider 21 can be detected by the monitor signal.

When it is detected that the slider 21 is located in a position where it depresses the lock member 41 (see FIG. 6), a control signal for inhibiting the operation of a motor (not shown) for driving the aforementioned transfer arm 31 is inputted to the motor, by which they are set so that neither selection nor loading of a disc is executed in this state.

By the operation of the slider 21 into the disc non-selective state in which the disc selection as described above is not executed, a magazine insertion standby state (see FIGS. 6 and 7) in inserting the magazine 50 into the magazine mounting section 9 for the mounting of the magazine is obtained.

In this magazine insertion standby state, as described above, the projecting portions 41a of the lock member 41 face the discs and/or trays 56 lodged in the magazine 50. That is, at least when the slider 21 is in the disc non-selective state in which no disc selection is executed, the lock member 41 prevents the discs and/or trays 56 from springing out of the magazine 50, and the mounting of the magazine 50 in the magazine mounting section 9 is executed when the slider 21 is in the disc non-selective state.

Therefore, even when the magazine 50 is inserted into the magazine mounting section 9 of the disc changer 1 with a force greater than a certain degree causing a force to be exerted on the tray 56 in the direction in which it is drawn out in excess of the retaining force of the tray retaining spring 52, the discs and/or trays 56 are infallibly prevented from springing out of the magazine 50 by the projecting portions 41a of the lock member 41.

By mounting the magazine 50 in the magazine mounting section 9 as described above and thereafter moving the slider 21 for the disc selection, the engagement state of the slider 21 with the fixed pin 43a of the swing arm 43 and the engagement projection 21a of the slider 21 is released, and the lock member 41 is lifted upward in FIGS. 6 and 7 by a specified quantity by the urging force of the spring 42.

By this operation, the lock member 41 is restored into the position where its groove portions 41b face the discs and/or trays 56 lodged in the magazine 50.

Then, the slider 21 makes a specified stroke movement to vary the tilt angle of the base block 14 according to the relative position of the inclined guide grooves 21h with respect to the guide pins 14p of the base block 14, in accordance with which the relative position of the discs lodged in the magazine 50 with respect to the recording and reproducing unit 10 varies for the selection of the desired disc.

Figure 8:
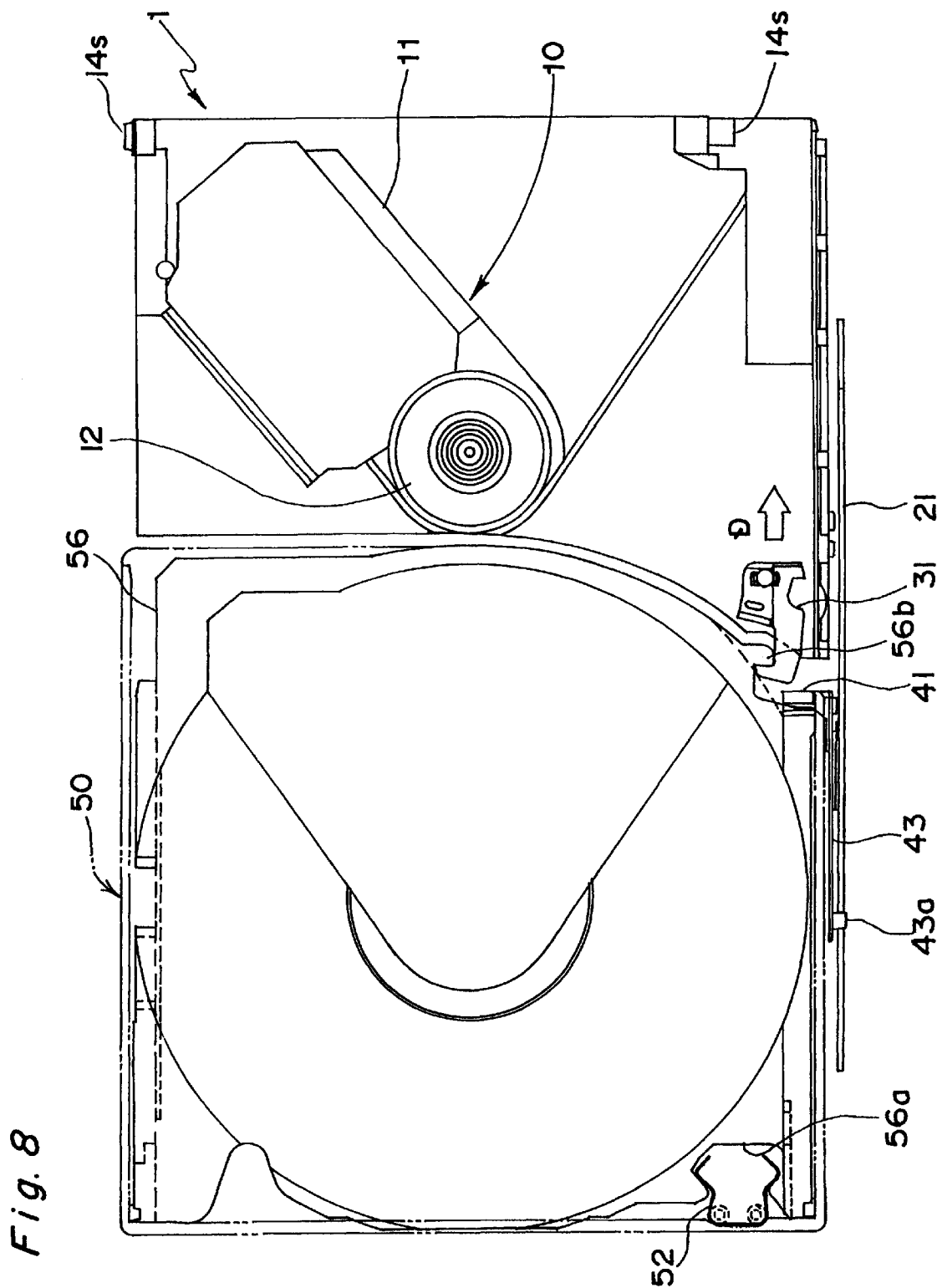
FIG. 8 is an explanatory plan view of the above disc changer in a magazine mounting state.
Figure 9:
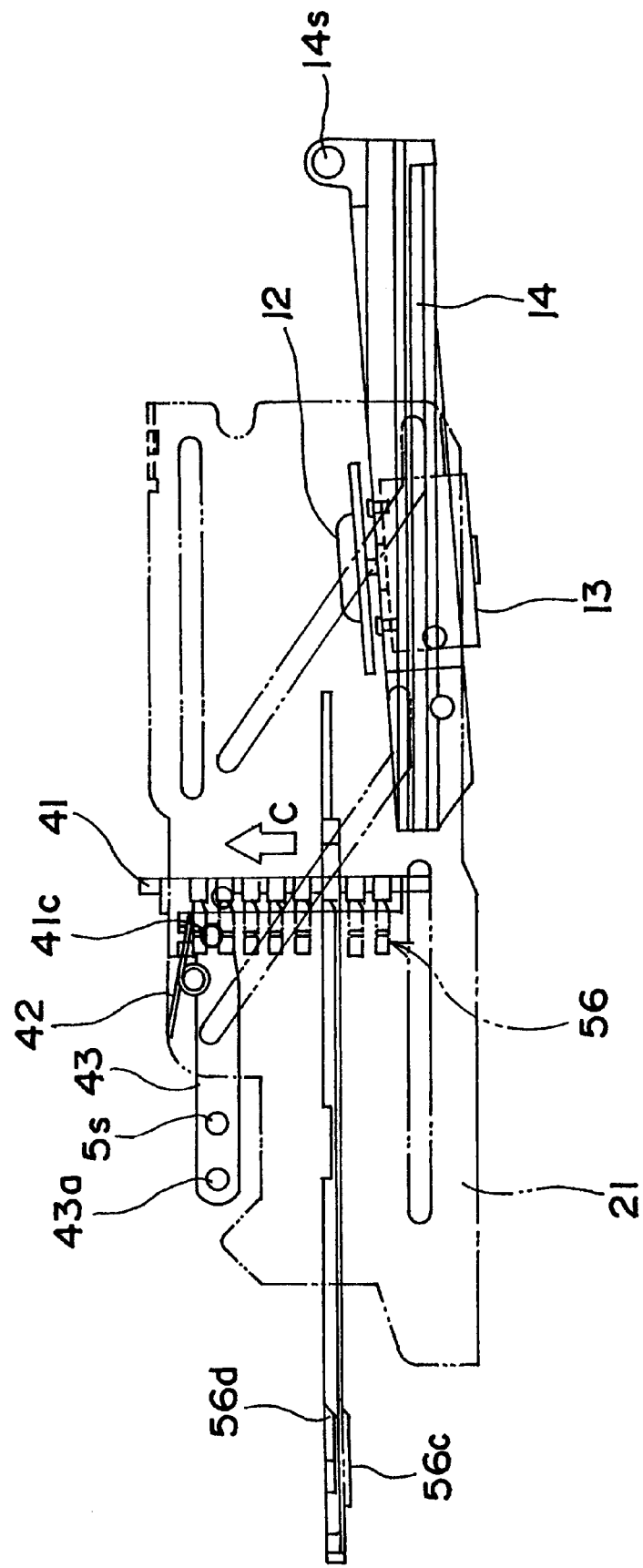
FIG. 9 is an explanatory side view of the inside of the above disc changer in a disc selective state.

Subsequently, the drive gear 33 (see FIG. 1) is rotatively driven to move the transfer arm 31 to the recording and reproducing unit 10 side, and as indicated by arrow D in FIG. 8, the tray 56 and disc (selected disc) engaged with this transfer arm 31 are drawn to the recording and reproducing unit 10 side.

Figure 10:
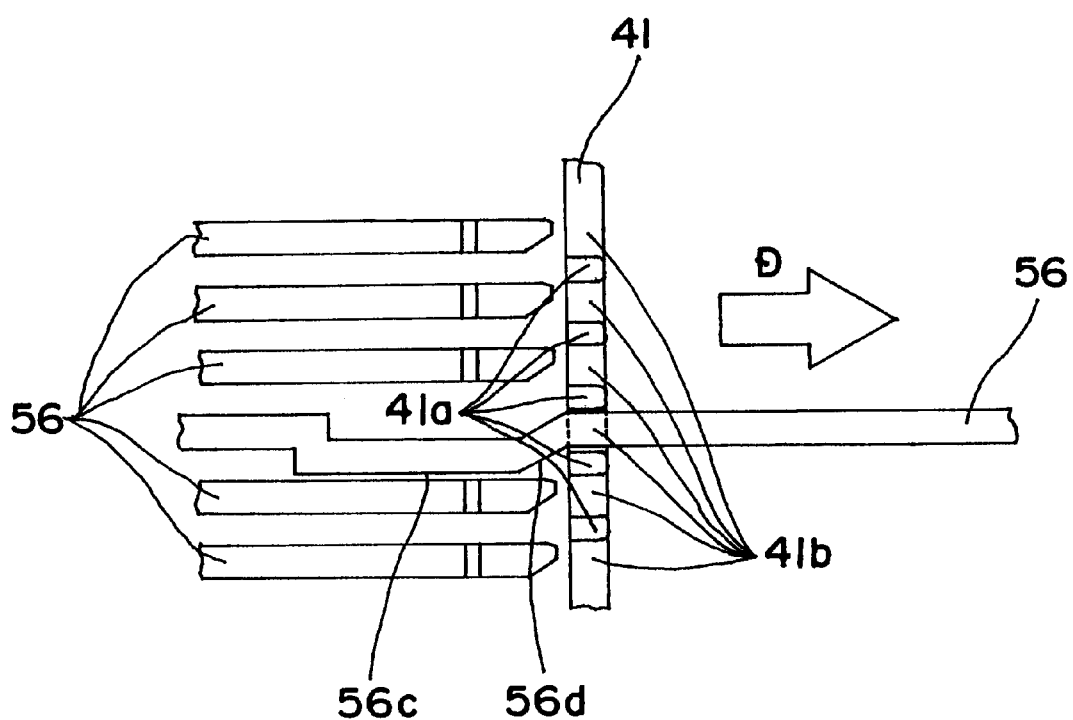
FIG. 10 is an explanatory enlarged side view of an operating section of the above tray in the disc selective state.

In the present embodiment, as shown in detail in FIG. 10, an offset portion 56c which is vertically offset from a part of the tray 56 is provided in a middle portion (concretely, for example, relatively near the end portion opposite to the drawing-out side) of the tray 56, and a tapered portion 56d having a specified slope angle on the drawing-out side of the offset portion 56c is also provided.

When a tray 56 is drawn out by a specified quantity, as shown in FIG. 10, the tapered portion 56d is engaged with the projecting portion 41a adjacent to the groove portion 41b through which the tray 56 is passing, thereby depressing the lock member 41 downward.

Figure 11:
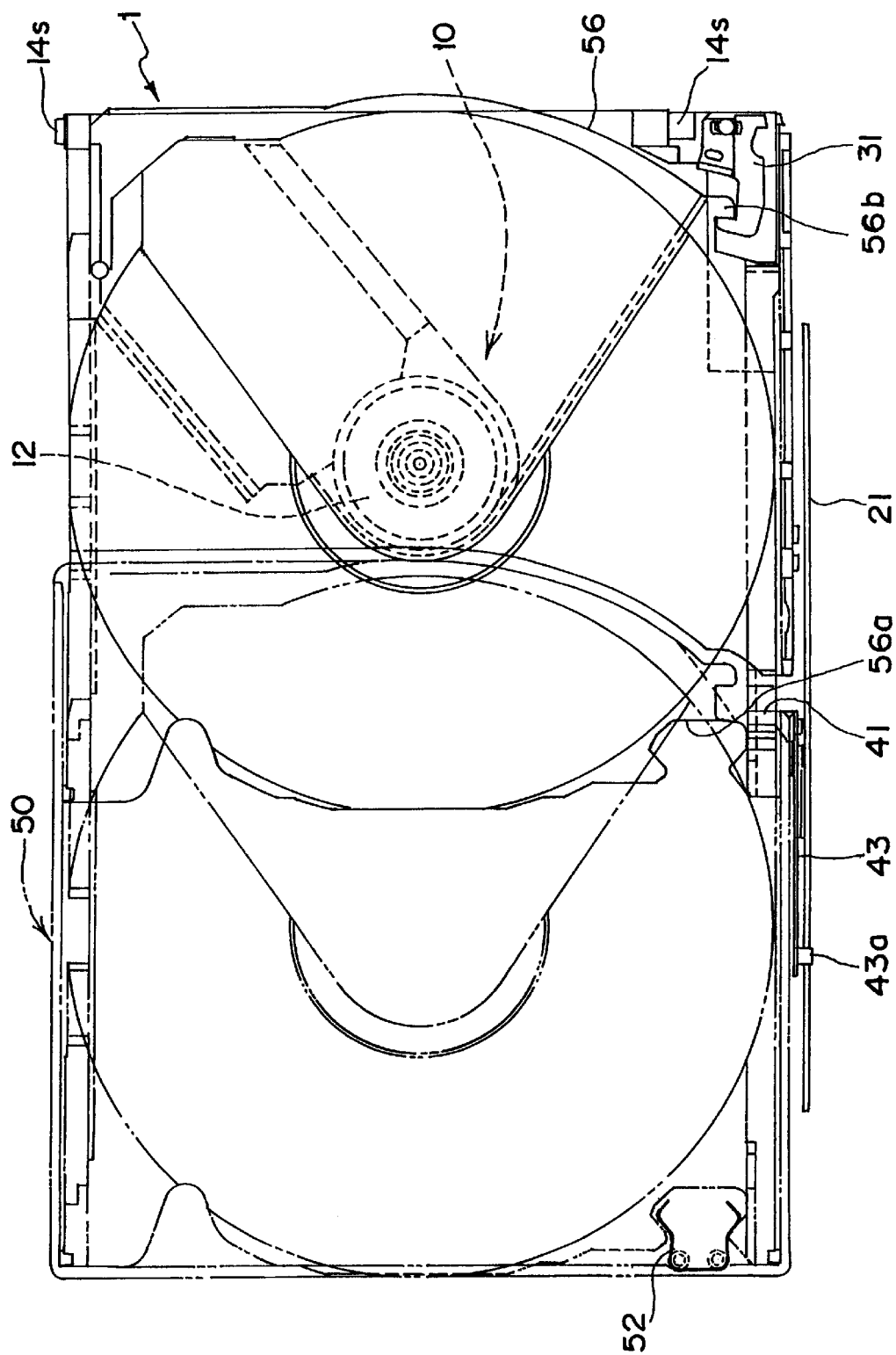
FIG. 11 is an explanatory plan view of the above disc changer in a disc loading state.
Figure 12:
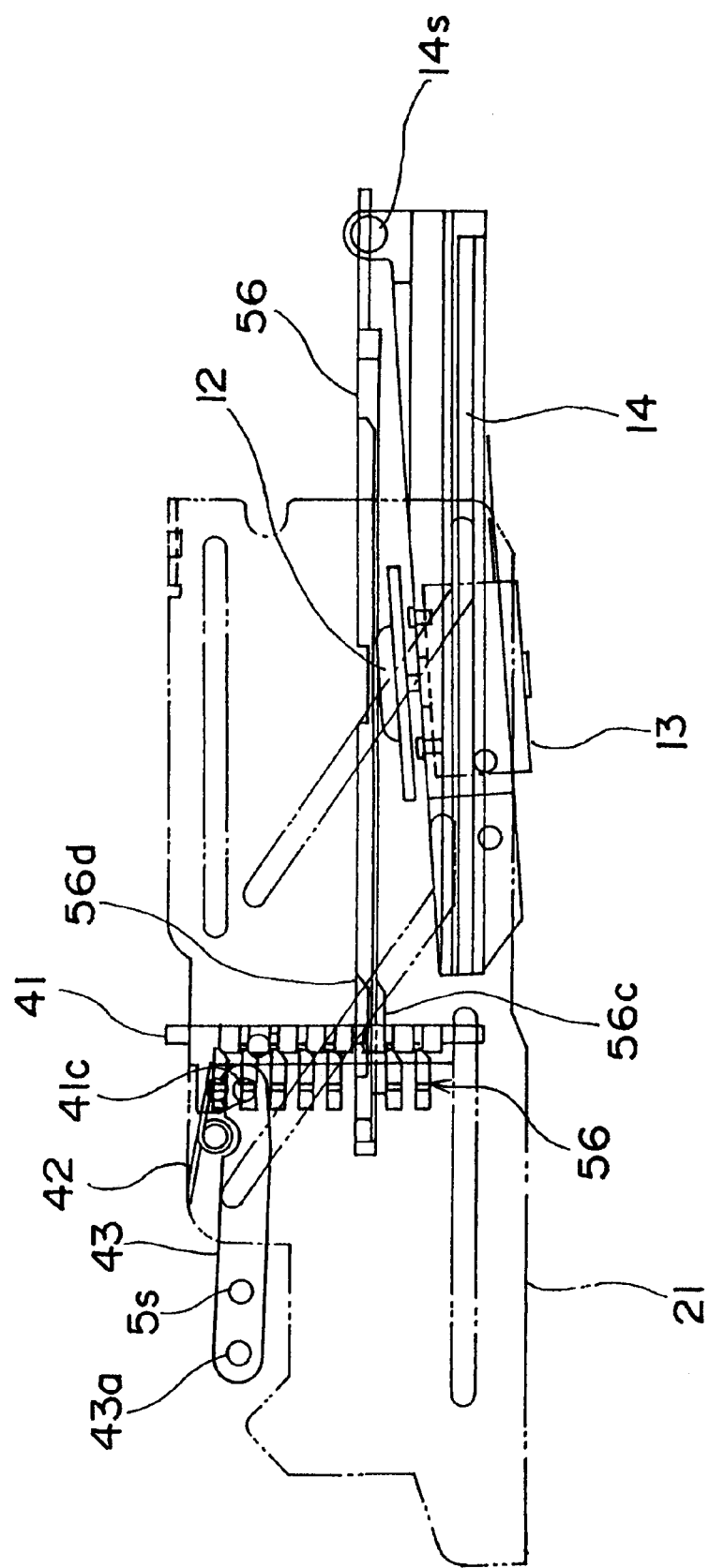
FIG. 12 is an explanatory side view of the inside of the above disc changer in the disc loading state.
Figure 13:
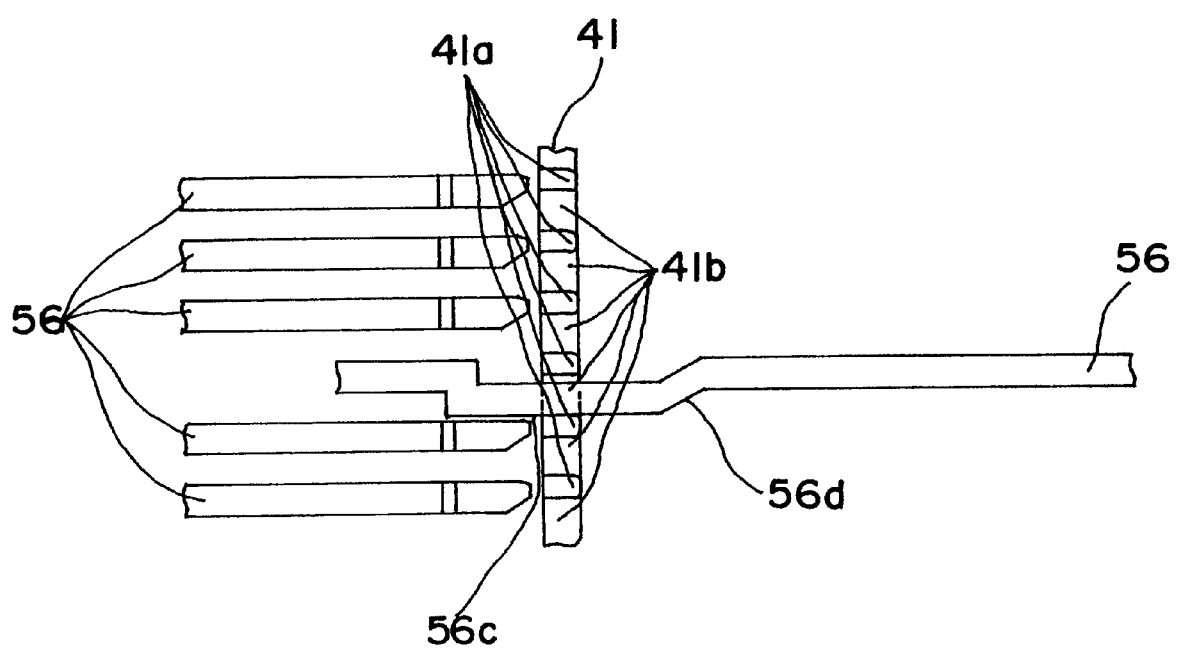
FIG. 13 is an explanatory enlarged side view of an operating section of the above tray in the disc loading state.

When the tray 56 is further drawn out and loaded on the turntable 12 of the recording and reproducing unit 10 (see FIGS. 11 and 12), the offset portion 56c of the tray 56 is engaged with the projecting portion 41a of the lock member 41, by which, as shown in FIG. 13, the lock member 41 is retained in a state in which it is depressed downward by the offset portion 56c, i.e., in a state in which the projecting portions 41a face the discs and/or trays 56 lodged in the magazine 50.

By this operation, the remaining discs and/or trays 56 except for the disc and tray 56 that are drawn out are prevented from springing out in the direction in which they are drawn out by virtue of the projecting portions 41a of the lock member 41.

That is, the offset portion 56c and the tapered portion 56d of the tray 56 constitute a locking operation section which operates to bring the lock member 41 into a locked state in which the discs and/or trays 56 are prevented from springing out by being drawn to the recording and reproducing unit 10 side.

With the provision of the above locking operation section, the discs and/or trays 56 are infallibly prevented from springing out of the magazine 50 by virtue of the projecting portions 41a of the lock member 41 even when a force in excess of the retaining force of the tray retaining spring 52 is exerted on the remaining trays 56 in the direction in which they are drawn out by the external vibration input or the like in a state in which the selected disc is drawn out together with its tray 56 and loaded on the recording and reproducing unit 10.

The above-mentioned embodiment (referred to as the first embodiment hereinafter) is in the case where the direction in which the magazine 50 is mounted in the magazine mounting section 9 coincides with the direction in which the disc and/or tray is drawn out of the magazine 50 to the recording and reproducing unit 10 side. However, in the case where these directions are different from each other, the discs and/or trays 56 lodged in the magazine 50 can be prevented from inadvertently springing out with a relatively simple construction.

A second embodiment of the present invention will be described next. In the following description, the same components as those of the first embodiment are denoted by the same reference numerals and no further description will be provided for them.

Figure 14:
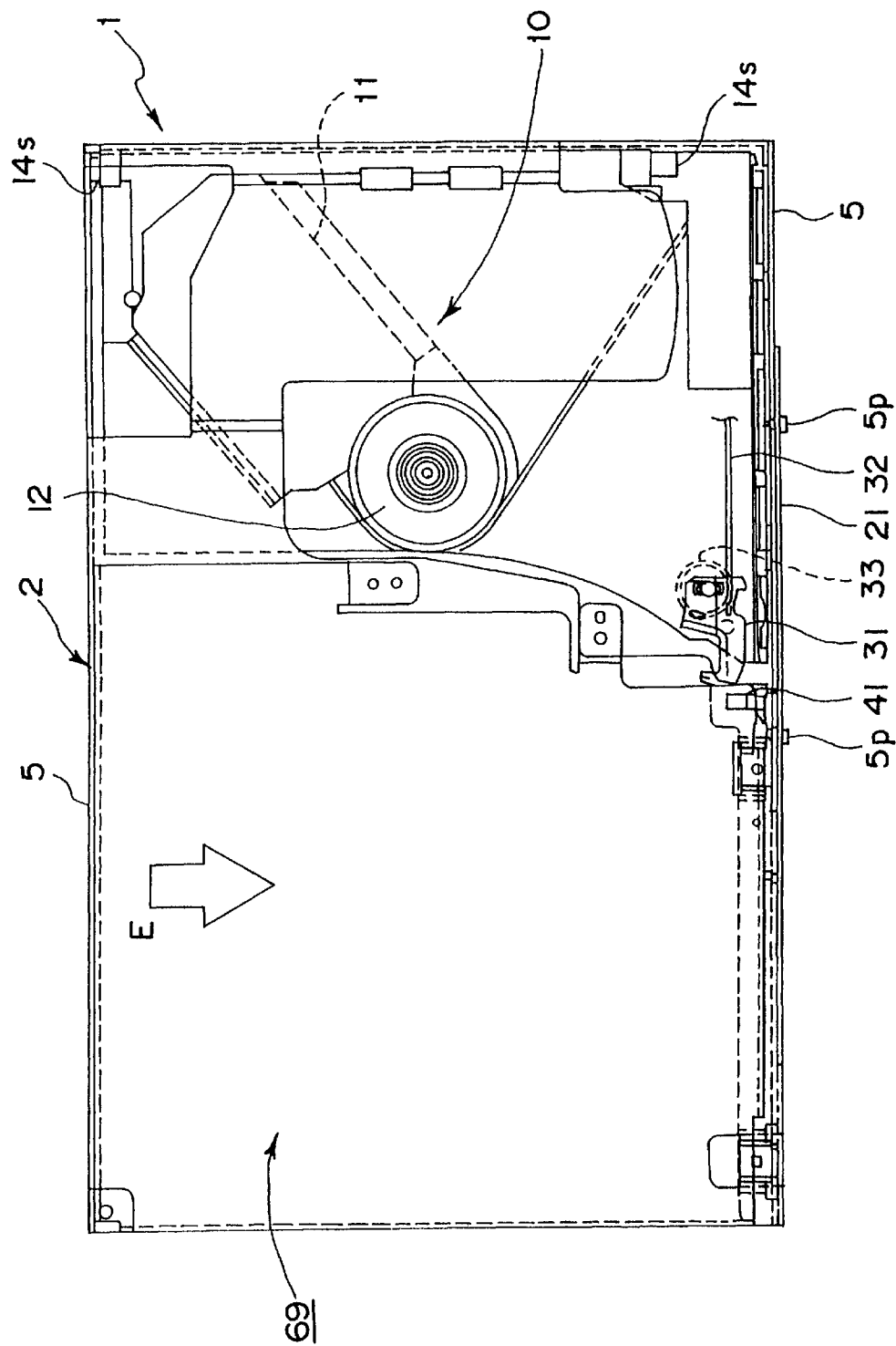
FIG. 14 is an explanatory plan view showing the schematic construction of a disc changer according to a second embodiment of the present invention.
Figure 15:
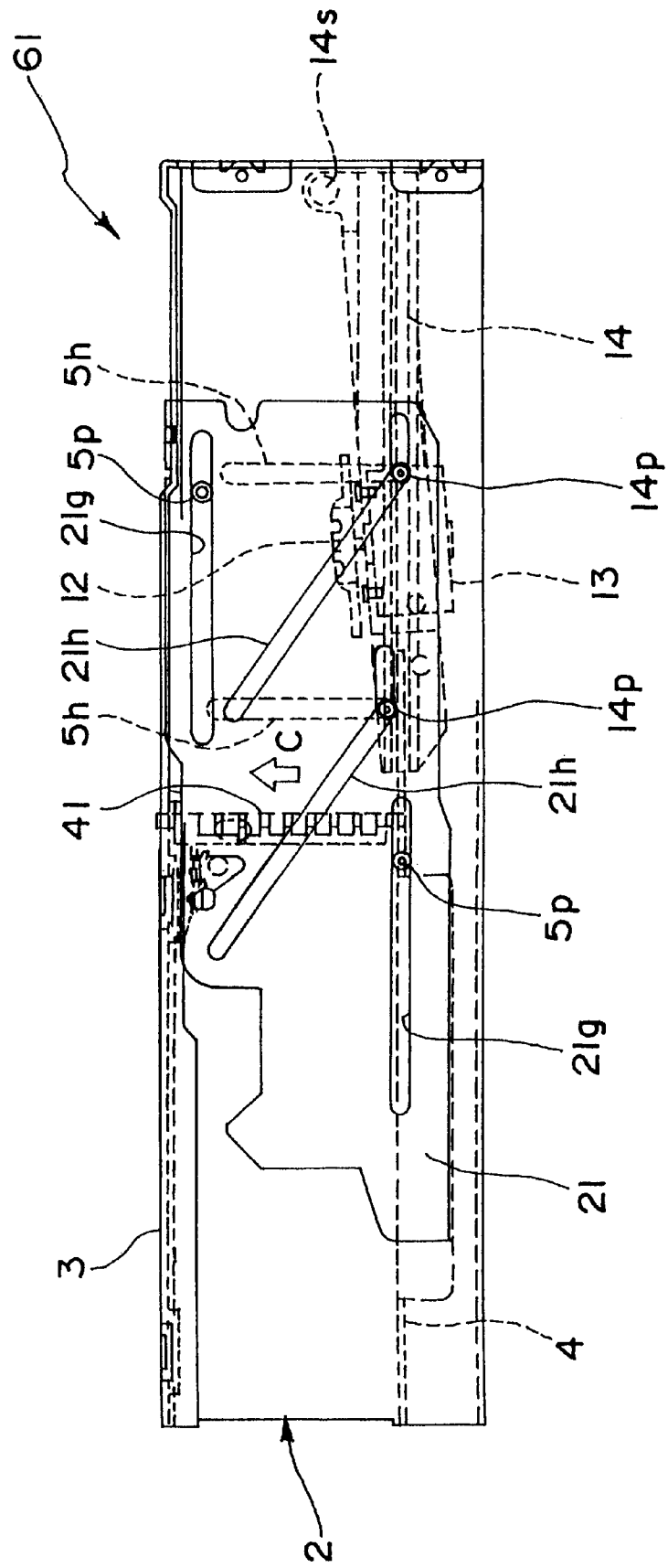
FIG. 15 is an explanatory side view of the disc changer of the second embodiment.
Figure 16:
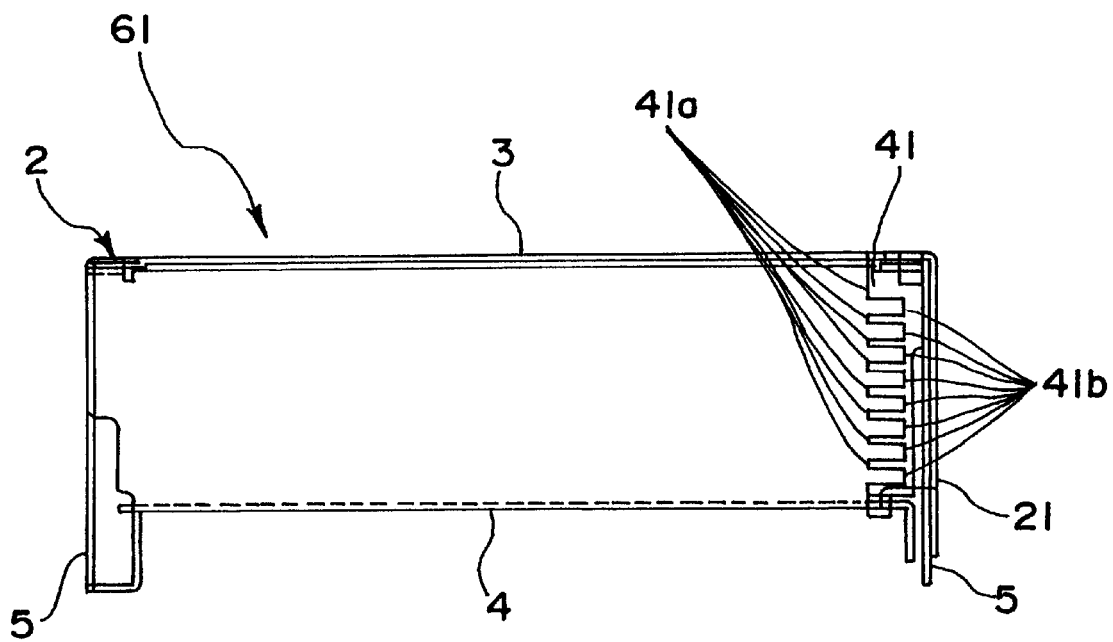
FIG. 16 is an explanatory front view of the disc changer of the second embodiment.

FIGS. 14, 15 and 16 illustrate an explanatory plan view, an explanatory side view and an explanatory front view, respectively, schematically showing the construction of a disc changer 61 according to the present second embodiment.

As shown in these figures, the disc changer 61 is provided with a recording and reproducing unit 10 located in one side region inside a main body 2 constituting an approximately rectangular parallelepiped casing, and a space adjacent to the recording and reproducing unit 10 in the lengthwise direction of the main body 2 constitutes a magazine mounting section 69. Its total construction is similar to that of the first embodiment, however, according to the present embodiment, a magazine 50 similar to the one shown in FIGS. 4 and 5 is inserted into a magazine mounting section 69 from the direction of arrow E in FIG. 14 for the mounting of the magazine.

That is, according to the present second embodiment, the direction in which the magazine 50 is mounted in the magazine mounting section 69 differs from the direction in which each disc and/or tray 56 is drawn out of the magazine 50 to the recording and reproducing unit 10 side. The magazine 50 is mounted in a direction perpendicular to the direction in which each disc and/or tray 56 is drawn out. In this case, the magazine 50 is inserted sidewise into the magazine mounting section 69 as indicated by arrow E in FIG. 4 so that the direction in which each disc and/or tray 56 is drawn out (see the direction of arrow A in FIG. 4) is directed toward the recording and reproducing unit 10.

Therefore, even though the magazine 50 is forcibly inserted into the magazine mounting section 69 when the magazine 50 is inserted for the mounting, neither the discs nor the trays 56 inside the magazine 50 inadvertently spring out.

Thus, according to the disc changer 61 according to the present second embodiment, there is no concern that the discs and/or trays 56 inadvertently spring out when the magazine is mounted. Therefore, in regard to the vertical position of the lock member 41 for preventing the discs and/or trays 56 from springing out of the magazine 50, it is neither required to set the magazine insertion standby state in contrast to the first embodiment nor required to interlock the lock member 41 with the disc selecting mechanism (slider 21). Therefore, the swing arm 43 for interlocking the slider 21 with the lock member 41 according to the stroke position of the slider 21 in the first embodiment is unnecessary and therefore not provided in this second embodiment.

Thus, except for the point that the swing arm 43 is not provided in terms of the structure and the point that the direction in which the magazine 50 is mounted is different from the direction in which each disc and/or tray 56 is drawn out of the magazine 50 in terms of use, the construction of the disc changer 61 of this second embodiment is basically the same as that of the disc changer 1 of the first embodiment.

That is, the lock member 41 is always urged upward (in the direction of arrow C in FIG. 15) by the urging force of the spring 42 in a state in which the magazine 50 is mounted in the magazine mounting section 69 similarly to the case of the first embodiment, and in this state in which the lock member 41 is lifted up as urged upward in the direction of arrow C, the groove portions 41b of the lock member 41 are set so that they face the discs and/or trays 56 lodged in the magazine 50.

Figure 17:
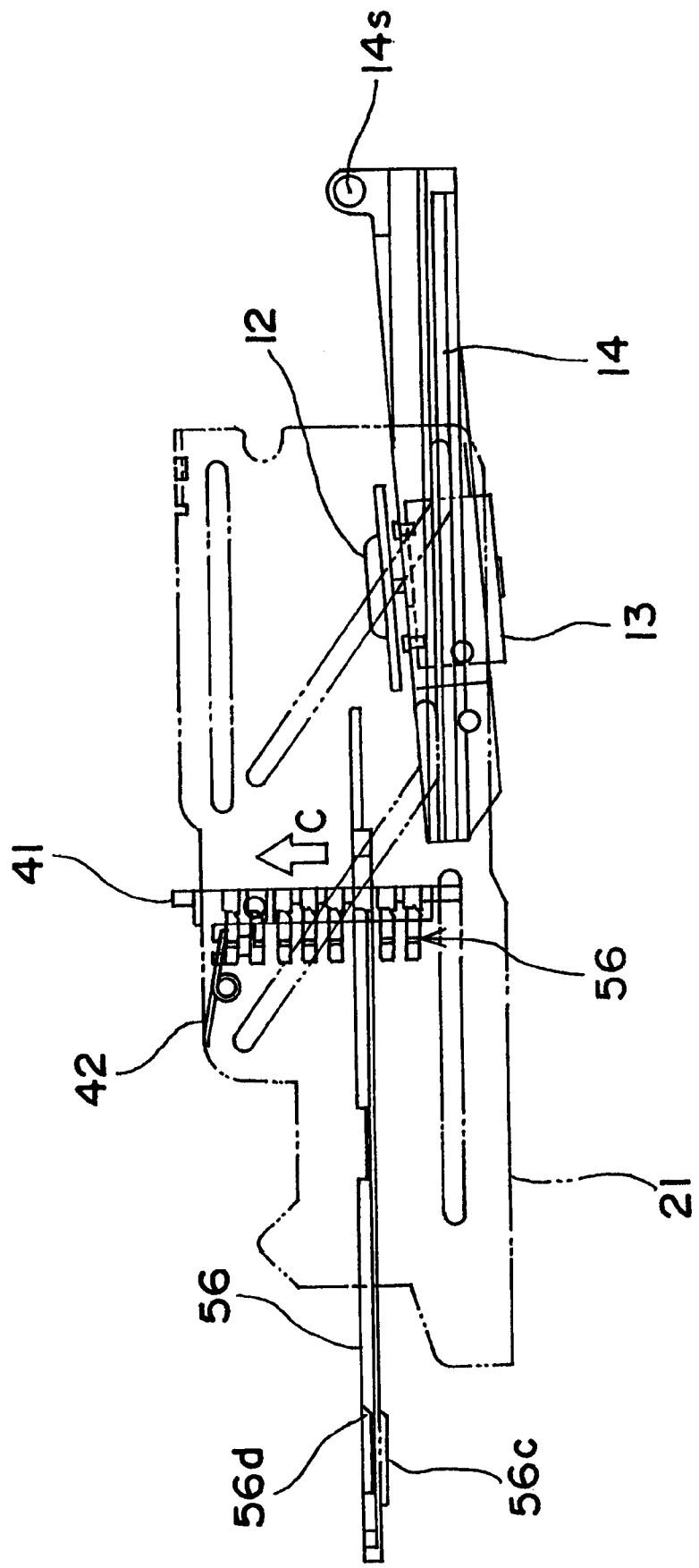
FIG. 17 is an explanatory side view of the inside of the disc changer of the second embodiment in the disc selective state.

When disc selection is executed by the disc selecting means (slider 21), the tilt angle of the base block 14 of the recording and reproducing unit 10 is varied according to this, and thereafter the selected disc and the tray 56 that is retaining the disc are drawn out of the magazine 50 by the disc loading mechanism (transfer arm 31) (see FIG. 17). In this stage, the disc and/or tray 56 is drawn out through the groove portion 41b of the lock member 41.

The tray 56 of the present second embodiment is provided with a locking operation section which is comprised of an offset portion 56c and a tapered portion 56d having a specified tilt angle (see FIG. 10 or 13) similar to those of the first embodiment as located in its middle portion (concretely, relatively near the end portion opposite to the drawing-out side) similarly to the first embodiment.

When the tray 56 is drawn out by a specified quantity as shown in FIG. 17, the tapered portion 56d is engaged with the projecting portion 41a adjacent to (below) the groove portion 41b through which the tray 56 is passing, thereby depressing the lock member 41 downward (see FIG. 10).

Figure 18:
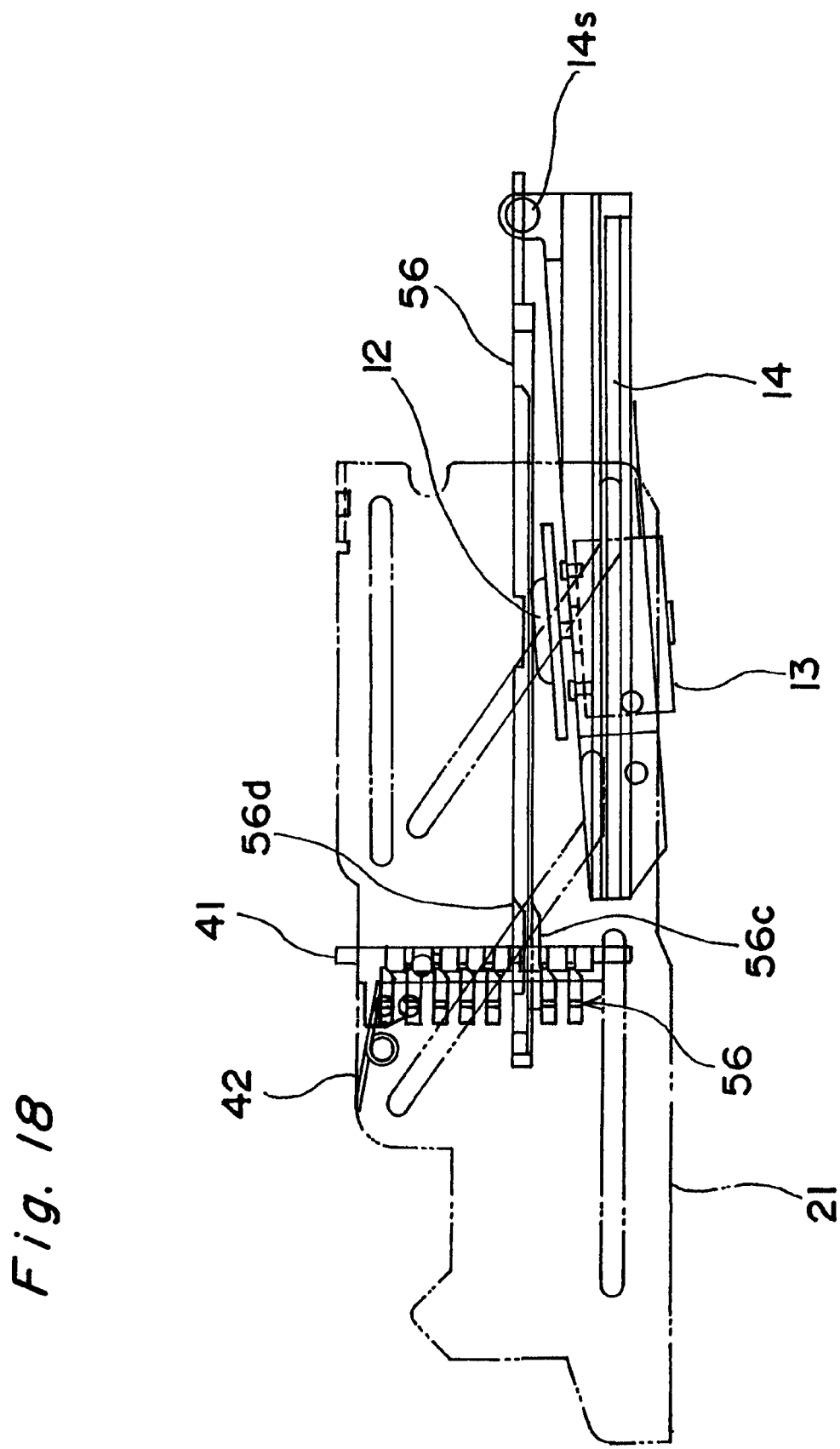
FIG. 18 is an explanatory side view of the inside of the disc changer of the second embodiment in the disc loading state.
Figure 19:
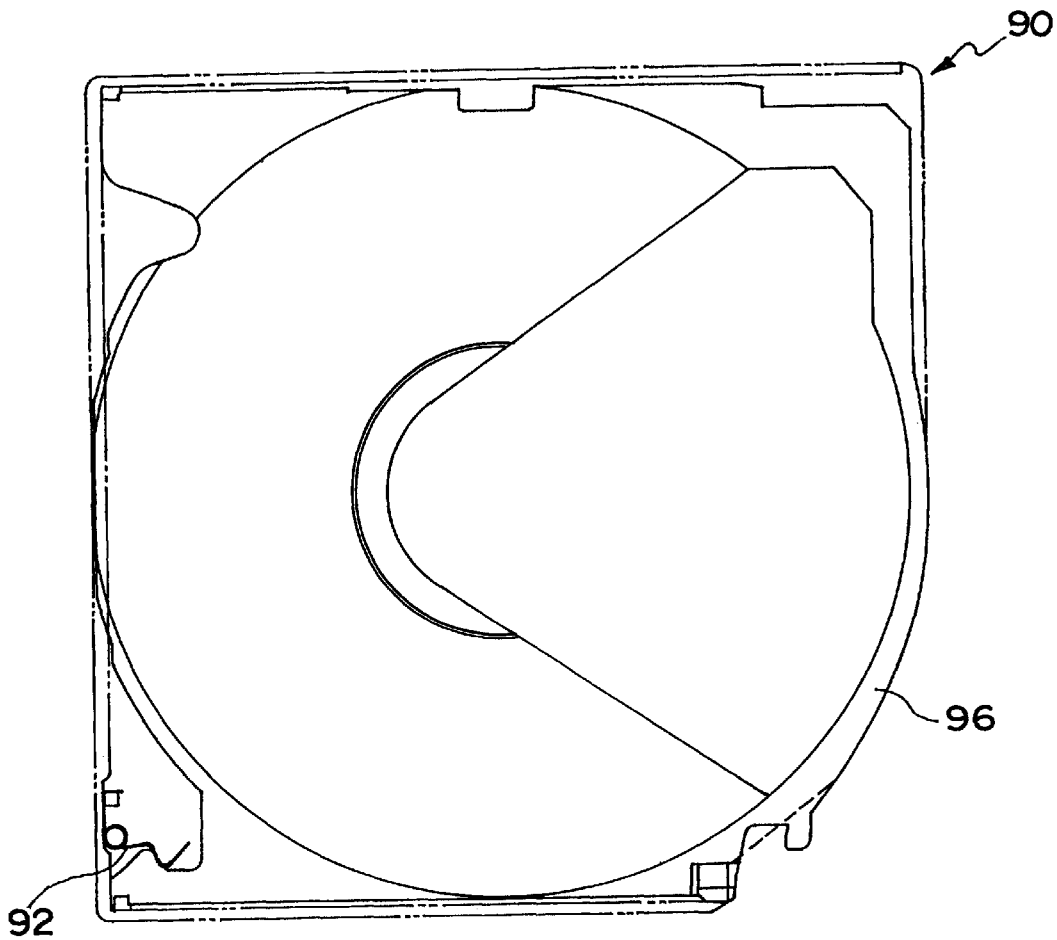
FIG. 19 is an explanatory plan view showing the schematic construction of a magazine to be mounted in a prior art disc changer.
Figure 20:
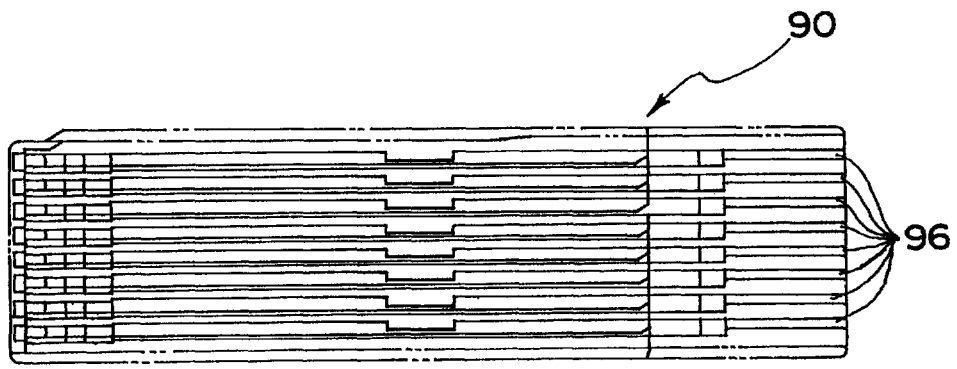
FIG. 20 is an explanatory side view of the magazine of the above prior art.

Subsequently, when the tray 56 is further drawn out and loaded on the turntable 12 of the recording and reproducing unit 10 as shown in FIG. 18, the offset portion 56c of the tray 56 is engaged with the projecting portion 41a of the lock member 41 (see FIG. 13), by which the lock member 41 is retained in a state in which it is depressed downward by the offset portion 56c, i.e., in a state in which the projecting portions 41a face the discs and/or trays 56 lodged in the magazine 50.

With this arrangement, similarly to the first embodiment, the remaining discs and/or trays 56 except for the disc and tray 56 that are drawn out are prevented from springing out in the direction in which they are drawn out by virtue of the projecting portions 41a of the lock member 41. That is, with the provision of the locking operation sections 56c and 56d, the discs and/or trays 56 are infallibly prevented from springing out of the magazine 50 by virtue of the projecting portions 41a of the lock member 41 even when a force in excess of the retaining force of the tray retaining spring 52 is exerted on the remaining trays 56 in the direction in which they are drawn out by the external vibration input or the like in a state in which the selected disc is drawn out together with its tray 56 and loaded on the recording and reproducing unit 10.

It is to be noted that the present invention is not limited to the aforementioned embodiments, and it is a matter of course that the invention can be subject to a variety of improvements and changes in design within the scope of the essence thereof.

According to the first aspect of the present invention, since the lock is provided, the discs are prevented from springing out of the magazine at least when the disc selecting mechanism is in the disc non-selective state in which no disc selection is executed. The mounting of the magazine in the magazine mounting section is executed when the disc selecting mechanism is in the disc non-selective state, and therefore, the discs are infallibly prevented from springing out by the lock in the magazine mounting stage.

That is, in the case where the direction in which each disc is drawn out of the magazine coincides with the direction in which the magazine is mounted in the magazine mounting section, the discs can be infallibly prevented from inadvertently springing out of the magazine by the lock member even though a great force is exerted in the direction in which the discs are drawn out when the magazine is forcibly inserted into the magazine mounting section in inserting the magazine into the magazine mounting section for the mounting of the magazine. This arrangement can eliminate the concern that a faulty operation, a trouble in taking out the magazine itself or another trouble is caused due to the interference between the recording and reproducing unit and the discs.

Furthermore, according to the second aspect of the present invention, basically the same effect as that of the first aspect of the present invention can be produced. In particular, the lock includes the lock member provided with the aforementioned projecting sections and groove sections, and the lock member is provided movably in the direction in which the discs are stacked. Therefore, by interlocking the disc selecting mechanism with the lock, the lock member can be moved in the direction in which the discs are stacked according to the operating state of the disc selecting mechanism.

That is, the above arrangement enables the setting that the projecting sections of the lock member face the discs and/or trays lodged in the magazine to prevent them from springing out of the magazine when the disc selecting mechanism is in the disc non-selective state and the groove sections of the lock member face the discs and/or trays lodged in the magazine to allow them to be drawn out to the recording and reproducing unit side by the disc loading mechanism when the disc selecting mechanism is in the disc selected state.

Furthermore, the third aspect of the present invention is provided with the lock capable of preventing the discs and/or trays from springing out of the magazine, and each tray is provided with the locking operation section. With this arrangement, when the selected disc is drawn out to the recording and reproducing unit side together with the tray that is retaining the disc, the lock is operated into the locked state in which the discs and/or trays are prevented from springing out by the locking operation section provided at the tray.

That is, even when a great force is exerted on the remaining discs and/or trays in the direction in which they are drawn out by the external vibration input or the like in a state in which the selected disc is drawn out together with its tray and loaded on the recording and reproducing unit, the remaining discs and/or trays are infallibly prevented from springing out of the magazine by the lock member that is operated into the locked state. This arrangement can eliminate the concern that a faulty operation, a trouble in taking out the magazine itself or another trouble is caused due to the interference between the recording and reproducing unit and the discs.

Furthermore, according to the fourth aspect of the present invention, basically the same effect as that of the third aspect of the present invention can be produced. In particular, the lock has a lock member provided with the aforementioned projecting sections and groove sections, and the lock member is provided movably in the direction in which the discs are stacked. Furthermore, each tray is provided with the locking operation section which operates the lock member in the direction in which the discs are stacked by being engaged with the projecting section adjacent to the groove section in the state in which the selected disc and/or tray is drawn out to the recording and reproducing unit side through the groove section corresponding to the selected disc and/or tray. With this arrangement, the remaining discs and/or trays can be infallibly prevented from inadvertently springing out of the magazine in the state in which the tray that is retaining the selected disc is drawn out to the recording and reproducing unit side.

What is claimed is:

1. A disc changer for use with a plurality of discs and a magazine capable of lodging therein the plurality of discs in a stacked manner at specified intervals inside the magazine on respective trays that retain the discs, said disc changer comprising:

a magazine mounting section into which the magazine is to be mounted during a disc non-selective state;

a recording and reproducing unit operable to record information onto a disc or to reproduce information recorded on a disc;

a disc selecting mechanism operable to select a desired disc from the plurality of discs lodged in the magazine while in a disc selective state;

a disc loading mechanism operable to draw the desired disc out of the magazine in a direction in which disc surfaces of the plurality of discs extend, together with the respective tray that retains the desired disc and to load the desired disc on said recording and reproducing unit; and a lock including a lock member arranged movably in a direction in which the discs are stacked and arranged between said magazine mounting section and said recording and reproducing unit, wherein said lock member includes projecting sections, formed at intervals equal to the specified intervals at which the discs are stacked in the magazine in the direction in which the discs are stacked, extending in a direction perpendicular to a direction in which the discs and trays are capable of springing out, and groove sections formed between said projecting sections, respectively, so as to correspond to said trays, respectively, wherein each groove section is capable of allowing a corresponding disc and tray to pass therethrough, and said lock is operable to prevent each disc from springing out of the magazine at least in a disc non-selective state in which said disc selecting mechanism is not operable to execute disc selection.

2. A disc changing system for use with a plurality of discs, said disc changing system comprising:

a magazine including a plurality of trays operable to retain the plurality of discs, respectively, wherein said magazine is capable of lodging therein the plurality of discs in a stacked manner at specified intervals inside the magazine on said trays;

a magazine mounting section into which said magazine is to be mounted during a disc non-selective state;

a recording and reproducing unit operable to record information onto a disc or to reproduce information recorded on a disc;

a disc selecting mechanism operable to select a desired disc from the plurality of discs lodged in said magazine while in a disc selective state;

a disc loading mechanism operable to draw the desired disc out of said magazine in a direction in which disc surfaces of the plurality of discs extend, together with a respective one of said plurality of trays that retains the desired disc and to load the desired disc on said recording and reproducing unit; and a lock including a lock member arranged movably in a direction in which the discs are stacked and arranged between said magazine and said recording and reproducing unit, wherein said lock member includes projecting sections, formed at intervals equal to the specified intervals at which the discs are stacked in said magazine in the direction in which the discs are stacked, extending in a direction perpendicular to a direction in which the discs and trays are capable of springing out, and groove sections formed between said projecting sections, respectively, so as to correspond to said trays, respectively, wherein each groove section is capable of allowing a corresponding disc and tray to pass therethrough, and said lock is operable to prevent each disc from springing out of said magazine at least in a disc non-selective state in which said disc selecting mechanism is not operable to execute disc selection.

3. A disc changing system for use with a plurality of discs, said disc changing system comprising:

a magazine including a plurality of trays operable to retain the plurality of discs, respectively, wherein said magazine is capable of lodging therein the plurality of discs in a stacked manner at specified intervals inside said magazine on said trays;

a magazine mounting section into which said magazine is to be mounted;

a recording and reproducing unit operable to record information onto a disc or to reproduce information recorded on a disc;

a disc selecting mechanism operable to select a desired disc from the plurality of discs lodged in said magazine;

a disc loading mechanism operable to draw the desired disc out of said magazine in a direction in which disc surfaces of the plurality of discs extend, together with a respective one of said plurality of trays that retains the desired disc, and to load the desired disc on said recording and reproducing unit; and a lock including a lock member arranged movably in a direction in which the discs are stacked and arranged between said magazine and said recording and reproducing unit, wherein said lock member includes projecting sections, formed at intervals equal to the specified intervals at which the discs are stacked in said magazine in the direction in which the discs are stacked, extending in a direction perpendicular to a direction in which the discs and trays are capable of springing out, and groove sections formed between said projecting sections, respectively, so as to correspond to said trays, respectively, wherein each of said groove sections is capable of allowing a corresponding disc and tray to pass therethrough, wherein said lock is operable to prevent each disc from springing out of said magazine;

wherein each tray of said magazine includes a respective locking operation section capable of operating said lock member in the direction in which the discs are stacked via engagement with a particular one of said projecting sections of said lock member that is adjacent to a particular one of said groove sections of said lock member through which said each tray passes so as to be operable, by being drawn out by said disc loading mechanism, to put said lock into a locked state in which said lock prevents the discs and said trays from springing out.

* * * * *